June 9, 1931. G. M. WRIGHT 1,809,617

FACSIMILE SYSTEM

Filed May 23, 1929

INVENTOR
G.M. WRIGHT

BY

ATTORNEY

Patented June 9, 1931

1,809,617

UNITED STATES PATENT OFFICE

GEORGE MAURICE WRIGHT, OF GREAT BADDOW, CHELMSFORD, ENGLAND, ASSIGNOR TO RADIO CORPORATION OF AMERICA, A CORPORATION OF DELAWARE

FACSIMILE SYSTEM

Application filed May 23, 1929, Serial No. 365,355, and in Great Britain May 31, 1928.

This invention relates to picture and the like facsimile telegraph transmitters, or to systems for picking up or analyzing sound recorded on the sound track of talking motion picture films, and more particularly to such transmitters of the kind in which light is projected by means of a lens or lens arrangement upon the picture, film, or the like to be transmitted, is modulated in intensity thereby, and is reflected or "scattered" therefrom upon a photo-electric cell or equivalent optico-electric translating device.

The invention has for its principal object to provide a transmitter of the kind referred to, which shall be simple, efficient and cheap to construct.

According to this invention the same lens or equivalent optical device which is employed in a transmitter of the kind referred to for projecting the incident light upon the picture or the like is employed also for collecting or concentrating the light of modulated intensity which is reflected or scattered from the said picture or the like.

Although not limited in its application thereto, the invention is particularly suitable for embodiment in a transmitter of the kind described in the specification of British Patent No. 276,399, and comprising a stationary source of light and light sensitive device, a message form or like device, an optical system mounted coaxially within the said form or device and adapted to project a point of light thereon and to collect therefrom reflected light varying in intensity according to the said message form or like device, and means for moving the optical system, and if desired the form or device, whereby the point of light is caused to move over substantially the whole surface of the form or device.

The invention is illustrated in the accompanying drawings which show schematically three arrangements in which the said invention is applied to a transmitter of the kind described in British patent specification No. 276,399.

Figure 1:
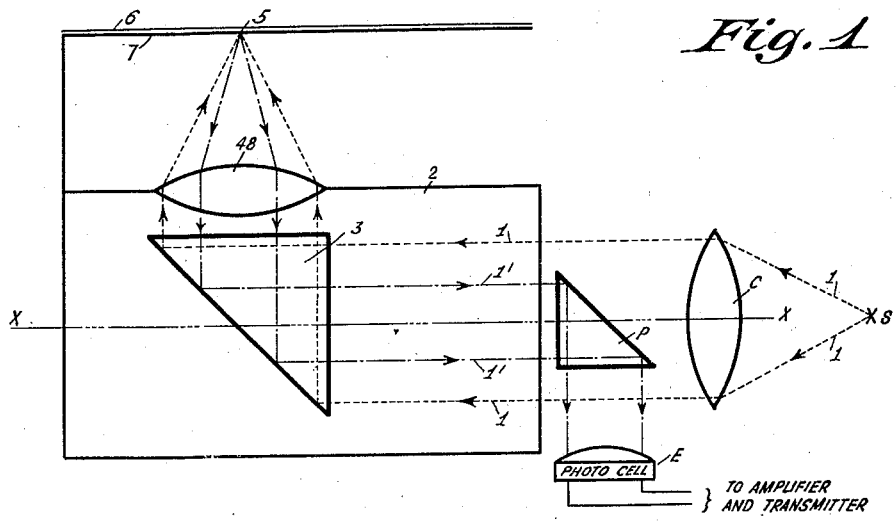
Figure 2:
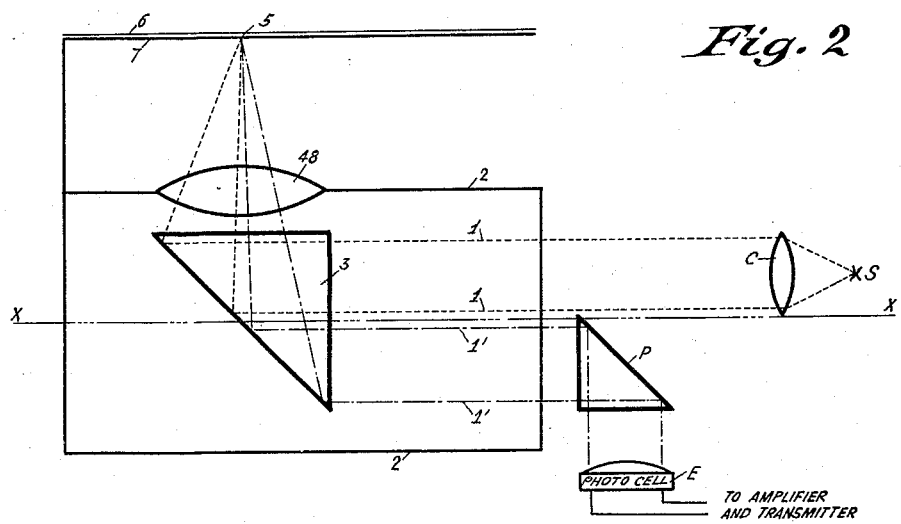
Figure 3:
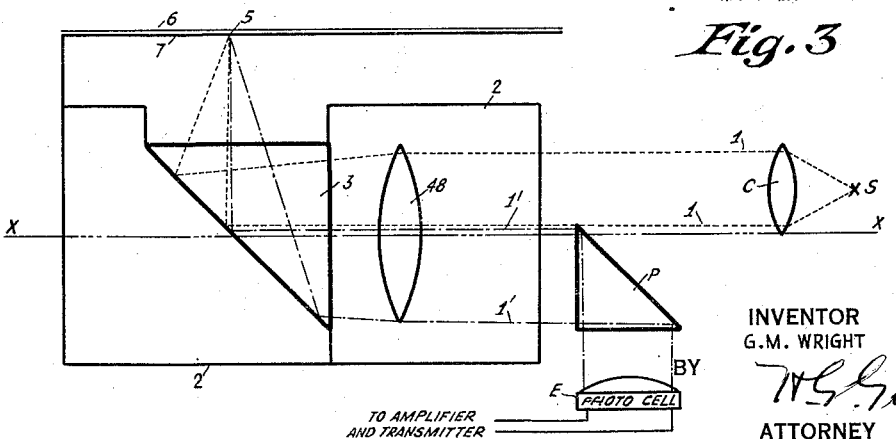

Fig. 1 of the drawings forming a part of this disclosure shows one form which the invention may assume; and, Figs. 2 and 3 represent modifications of the system disclosed by Fig. 1.

Referring to Figure 1, 1—1 are lines representing the boundaries of a beam of light issuing from a suitable illumination source S. The said light is projected axially along a tube 2 which is rotatably mounted about an axis $x\ x$, and after passing through suitable condenser arrangements indicated at C, is diverted through a right angle by means of a prism 3, so that it passes through a lens 48 of wide aperture mounted in the wall of the tube 2, and is focused to form an image point at 5 upon the message form 6 which is suitably affixed to the outside of a carrier 7 formed as a tube or part of a tube concentric with the first mentioned tube and made of transparent material, such as glass.

Light is reflected back from the image point 5 through the lens 48 of wide aperture, whence the reflected beam is again diverted through a right angle by means of the prism 3, so that it is projected axially along the tube back along a path indicated by the lines $1'—1'$, and which is concentric with and parallel within the path 1—1 followed by the incident light.

Mounted at a suitable distance along the tube axis is a small stationary mirror, inclined at 45° or, as shown, a right-angle prism P, serving to cause the modulated light to impinge upon a photo-electric cell E. Alternatively, in place of the small stationary mirror or prism P, there may be employed a plane mirror extending substantially right across the tube 2 and adapted to pass modulated light through a lens to the photo-electric cell, the said plane mirror having a central hole through which incident light may pass.

In this arrangement, of course, the incident light will be in the form of a beam lying axially within and parallel to the reflected beam instead of the latter beam lying axially within the incident beam as in the construction illustrated in Figure 1.

Figure 2 shows a modification of the arrangement shown in Figure 1, differing therefrom only in that the incident light beam lies above and the reflected light beam below the axis of rotation *x x*, the prism 3 being sufficiently large to divert both beams. It will be seen that with this arrangement, as the prism 3 rotates the inclined face thereof sweeps across the incident and reflected beams; thus, when the prism has rotated 180° from the position shown in Figure 2, the incident light will be reflected by that part of the inclined surface from which the returning beam is reflected when the prism is in the position shown.

In the modification shown in Figure 3, the lens 48 is stationary and is interposed in the path of the incident and reflected beam on the side of the prism 3 remote from the reflecting point 5.

Apparatus in accordance with the present invention possesses a number of advantages of practical importance, chief among these advantages being:—

(1) The lens system embodied in a transmitter may be identical with that utilized in a receiver, thus permitting standardization.

(2) The lens system may be made of larger aperture than is convenient with known transmitters, in which a separate lens for reflected light is mounted in close proximity to a lens for incident light.

(3) The cost of a single lens, even of large aperture, is generally less than that of two lenses.

(4) The weight of the moving optical parts can be considerably reduced, thereby simplifying the problem of securing smooth motion of the scanning spot.

Other modifications and changes will at once suggest themselves to those skilled in the art to which the invention relates and, therefore, the invention is to be considered in a broad and unlimited sense, and I believe myself to be entitled to make any and all modifications such as fall fairly within the spirit and scope of the hereinafter appended claims.

Having described my invention, what I claim is:

1. A picture transmission system including a record carrying drum, a rotating prism mounted internally of said record carrying drum and adapted to be rotated within said drum, a wide aperture lens adjacent said prism and adapted to be rotated simultaneously therewith, a light source arranged centrally of said prism, said prism and lens being adapted to direct the light from said source toward the record surface carried upon said drum and to collect and re-direct the reflected light from said record surface along a path parallel to the path of projection, a stationary prism external to the path of incident light for re-directing the reflected light, and a photoelectric element in the path of said re-directed light from said prism for converting the re-directed light into proportionate strength electric current impulses.

2. A picture transmission system including a light source, a record carrying drum, a rotating prism mounted internally of said record carrying drum and adapted to be rotated within said drum, a wide aperture lens adjacent said prism and adapted to be rotated simultaneously therewith, said prism and lens being adapted to project the light from said source as an incident beam upon the record surface carried upon said drum and adapted to collect the diffusely reflected light from said record surface and re-direct the same along a path separated from the path of incident light, a photoelectric element for converting light values into proportionate strength electric current impulses, and optical means for directing the diffusely reflected light from said picture surface which reaches said lens and prism to said photoelectric element.

GEORGE MAURICE WRIGHT.